(12) United States Patent
Annadurai et al.

(10) Patent No.: US 7,643,517 B2
(45) Date of Patent: *Jan. 5, 2010

(54) METHOD AND CIRCUIT FOR DE-SKEWING DATA IN A COMMUNICATION SYSTEM

(76) Inventors: Andy P. Annadurai, 5112 Amberwood Dr., Fremont, CA (US) 94555; Feng Han, 1541 Poppybank Ct., Pleasanton, CA (US) 94566; Mohammed Rahman, 3689 Huff Ct., Pleasanton, CA (US) 94588; Chris Tsu, 13625 Surrey La., Saratoga, CA (US) 95070

( * ) Notice: Subject to any disclaimer, the term of this patent is extended or adjusted under 35 U.S.C. 154(b) by 520 days.

This patent is subject to a terminal disclaimer.

(21) Appl. No.: 11/514,358

(22) Filed: Aug. 30, 2006

(65) Prior Publication Data

US 2007/0019685 A1 Jan. 25, 2007

Related U.S. Application Data

(63) Continuation of application No. 09/988,896, filed on Nov. 19, 2001, now Pat. No. 7,130,317.

(51) Int. Cl.
*H04J 3/06* (2006.01)
(52) U.S. Cl. .................................... 370/516
(58) Field of Classification Search ................ 370/516, 370/315, 402, 355, 335, 508, 515, 518, 401; 714/700; 375/346, 373; 713/401
See application file for complete search history.

(56) References Cited

U.S. PATENT DOCUMENTS 3,812,531 A    5/1974   Hall
5,022,056 A *  6/1991   Henderson et al. .......... 375/373
5,298,866 A    3/1994   Kaplinsky
5,490,165 A *  2/1996   Blakeney et al. ............ 370/335
5,507,029 A    4/1996   Granato et al.
5,719,862 A *  2/1998   Lee et al. .................... 370/355

(Continued)

OTHER PUBLICATIONS

Clements, S.M., et al., "Very high speed continuous sampling using matched delays;" Mar. 17, 1994; Electronics Letters; vol. 30; Issue 6; pp. 463-465.

*Primary Examiner*—Hong Cho
*Assistant Examiner*—Prenell P Jones
(74) *Attorney, Agent, or Firm*—McDonnell Boehnen Hulbert & Berghoff LLP (57) ABSTRACT

Method and circuitry for de-skewing data in data communication networks such as a SONET. The data is sent from a system chip to a framer chip where the data is de-skewed. To detect data skew, the system chip sends a training sequence to the framer chip. The information bits sent to the framer chip are searched in order to detect the training sequence. The training sequences contain clear transition patterns at which all 16 bits of the transmit data and the TCTL signal line are inverted. If any bit does not invert, this bit must be a skewed bit. Based on the data one clock cycle before and one clock cycle after this transition, the skewed bit can be corrected back. After the data skew is detected, a multiplexing logic circuitry is used to correct the skew based on one clock cycle either before or after the transition. The multiplexing logic circuitry includes at least three registers coupled to the inputs of the multiplexing logic circuitry.

21 Claims, 11 Drawing Sheets

U.S. PATENT DOCUMENTS

| | | | |
|---|---|---|---|
| 5,819,075 A * | 10/1998 | Forsmo | 713/401 |
| 6,031,847 A * | 2/2000 | Collins et al. | 370/508 |
| 6,775,302 B1 | 8/2004 | Shaffer et al. | |
| 6,874,097 B1 | 3/2005 | Aliahmad et al. | |
| 6,909,727 B1 | 6/2005 | Shaffer et al. | |
| 7,130,317 B2 * | 10/2006 | Annadurai et al. | 370/516 |
| 2002/0006177 A1 | 1/2002 | Pickering et al. | |
| 2002/0091885 A1 | 7/2002 | Hendrickson et al. | |
| 2003/0095575 A1* | 5/2003 | Annadurai et al. | 370/516 |
| 2005/0276316 A1 | 12/2005 | Rabaeijs et al. | |
| 2006/0098768 A1* | 5/2006 | Romero et al. | 375/346 |

* cited by examiner

| Cycle | Tctl | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|
| 1 | 1 | 0 | X | X | 0 | 0 | 0 | 0 | 0 | 0 | 0 | 0 | 0 | A | B | C | D |
| 2 | 1 | 0 | 0 | 0 | 0 | 1 | 1 | 1 | 1 | 1 | 1 | 1 | 1 | 1 | 1 | 1 | 1 |
| 3 | 1 | 0 | 0 | 0 | 0 | 1 | 1 | 1 | 1 | 1 | 1 | 1 | 1 | 1 | 1 | 1 | 1 |
| 4 | 1 | 0 | 0 | 0 | 0 | 1 | 1 | 1 | 1 | 1 | 1 | 1 | 1 | 1 | 1 | 1 | 1 |
| 5 | 1 | 0 | 0 | 0 | 0 | 1 | 1 | 1 | 1 | 1 | 1 | 1 | 1 | 1 | 1 | 1 | 1 |
| 6 | 1 | 0 | 0 | 0 | 0 | 1 | 1 | 1 | 1 | 1 | 1 | 1 | 1 | 1 | 1 | 1 | 1 |
| 7 | 1 | 0 | 0 | 0 | 0 | 1 | 1 | 1 | 1 | 1 | 1 | 1 | 1 | 1 | 1 | 1 | 1 |
| 8 | 1 | 0 | 0 | 0 | 0 | 1 | 1 | 1 | 1 | 1 | 1 | 1 | 1 | 1 | 1 | 1 | 1 |
| 9 | 1 | 0 | 0 | 0 | 0 | 1 | 1 | 1 | 1 | 1 | 1 | 1 | 1 | 1 | 1 | 1 | 1 |
| 10 | 1 | 0 | 0 | 0 | 0 | 1 | 1 | 1 | 1 | 1 | 1 | 1 | 1 | 1 | 1 | 1 | 1 |
| 11 | 1 | 0 | 0 | 0 | 0 | 1 | 1 | 1 | 1 | 1 | 1 | 1 | 1 | 1 | 1 | 1 | 1 |
| 12 | 0 | 1 | 1 | 1 | 1 | 0 | 0 | 0 | 0 | 0 | 0 | 0 | 0 | 0 | 0 | 0 | 0 |
| 13 | 0 | 1 | 1 | 1 | 1 | 0 | 0 | 0 | 0 | 0 | 0 | 0 | 0 | 0 | 0 | 0 | 0 |
| 14 | 0 | 1 | 1 | 1 | 1 | 0 | 0 | 0 | 0 | 0 | 0 | 0 | 0 | 0 | 0 | 0 | 0 |
| 15 | 0 | 1 | 1 | 1 | 1 | 0 | 0 | 0 | 0 | 0 | 0 | 0 | 0 | 0 | 0 | 0 | 0 |
| 16 | 0 | 1 | 1 | 1 | 1 | 0 | 0 | 0 | 0 | 0 | 0 | 0 | 0 | 0 | 0 | 0 | 0 |
| 17 | 0 | 1 | 1 | 1 | 1 | 0 | 0 | 0 | 0 | 0 | 0 | 0 | 0 | 0 | 0 | 0 | 0 |
| 18 | 0 | 1 | 1 | 1 | 1 | 0 | 0 | 0 | 0 | 0 | 0 | 0 | 0 | 0 | 0 | 0 | 0 |
| 19 | 0 | 1 | 1 | 1 | 1 | 0 | 0 | 0 | 0 | 0 | 0 | 0 | 0 | 0 | 0 | 0 | 0 |
| 20 | 0 | 1 | 1 | 1 | 1 | 0 | 0 | 0 | 0 | 0 | 0 | 0 | 0 | 0 | 0 | 0 | 0 |
| 21 | 0 | 1 | 1 | 1 | 1 | 0 | 0 | 0 | 0 | 0 | 0 | 0 | 0 | 0 | 0 | 0 | 0 |
| 20α−18 | 1 | 0 | 0 | 0 | 0 | 1 | 1 | 1 | 1 | 1 | 1 | 1 | 1 | 1 | 1 | 1 | 1 |
| 20α−17 | 1 | 0 | 0 | 0 | 0 | 1 | 1 | 1 | 1 | 1 | 1 | 1 | 1 | 1 | 1 | 1 | 1 |
| 20α−16 | 1 | 0 | 0 | 0 | 0 | 1 | 1 | 1 | 1 | 1 | 1 | 1 | 1 | 1 | 1 | 1 | 1 |
| 20α−15 | 1 | 0 | 0 | 0 | 0 | 1 | 1 | 1 | 1 | 1 | 1 | 1 | 1 | 1 | 1 | 1 | 1 |
| 20α−14 | 1 | 0 | 0 | 0 | 0 | 1 | 1 | 1 | 1 | 1 | 1 | 1 | 1 | 1 | 1 | 1 | 1 |
| 20α−13 | 1 | 0 | 0 | 0 | 0 | 1 | 1 | 1 | 1 | 1 | 1 | 1 | 1 | 1 | 1 | 1 | 1 |
| 20α−12 | 1 | 0 | 0 | 0 | 0 | 1 | 1 | 1 | 1 | 1 | 1 | 1 | 1 | 1 | 1 | 1 | 1 |
| 20α−11 | 1 | 0 | 0 | 0 | 0 | 1 | 1 | 1 | 1 | 1 | 1 | 1 | 1 | 1 | 1 | 1 | 1 |
| 20α−10 | 1 | 0 | 0 | 0 | 0 | 1 | 1 | 1 | 1 | 1 | 1 | 1 | 1 | 1 | 1 | 1 | 1 |
| 20α−9 | 1 | 0 | 0 | 0 | 0 | 1 | 1 | 1 | 1 | 1 | 1 | 1 | 1 | 1 | 1 | 1 | 1 |
| 20α−8 | 0 | 1 | 1 | 1 | 1 | 0 | 0 | 0 | 0 | 0 | 0 | 0 | 0 | 0 | 0 | 0 | 0 |
| 20α−7 | 0 | 1 | 1 | 1 | 1 | 0 | 0 | 0 | 0 | 0 | 0 | 0 | 0 | 0 | 0 | 0 | 0 |
| 20α−6 | 0 | 1 | 1 | 1 | 1 | 0 | 0 | 0 | 0 | 0 | 0 | 0 | 0 | 0 | 0 | 0 | 0 |
| 20α−5 | 0 | 1 | 1 | 1 | 1 | 0 | 0 | 0 | 0 | 0 | 0 | 0 | 0 | 0 | 0 | 0 | 0 |
| 20α−4 | 0 | 1 | 1 | 1 | 1 | 0 | 0 | 0 | 0 | 0 | 0 | 0 | 0 | 0 | 0 | 0 | 0 |
| 20α−3 | 0 | 1 | 1 | 1 | 1 | 0 | 0 | 0 | 0 | 0 | 0 | 0 | 0 | 0 | 0 | 0 | 0 |
| 20α−2 | 0 | 1 | 1 | 1 | 1 | 0 | 0 | 0 | 0 | 0 | 0 | 0 | 0 | 0 | 0 | 0 | 0 |
| 20α−1 | 0 | 1 | 1 | 1 | 1 | 0 | 0 | 0 | 0 | 0 | 0 | 0 | 0 | 0 | 0 | 0 | 0 |
| 20α | 0 | 1 | 1 | 1 | 1 | 0 | 0 | 0 | 0 | 0 | 0 | 0 | 0 | 0 | 0 | 0 | 0 |
| 20α+1 | 0 | 1 | 1 | 1 | 1 | 0 | 0 | 0 | 0 | 0 | 0 | 0 | 0 | 0 | 0 | 0 | 0 |

FIG.2

| Cycle | Tctl | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|
| 1 | 1 | 0 | X | X | 0 | 0 | 0 | 0 | 0 | 0 | 0 | 0 | 0 | A | B | C | D |
| 2 | 1 | 0 | 0 | 0 | 0 | 1 | 1 | 1 | 1 | 1 | 1 | 1 | 1 | 1 | 1 | 1 | 1 |
| 3 | 1 | 0 | 0 | 0 | 0 | 1 | 1 | 1 | 1 | 1 | 1 | 1 | 1 | 1 | 1 | 1 | 1 |
| 4 | 1 | 0 | 0 | 0 | 0 | 1 | 1 | 1 | 1 | 1 | 1 | 1 | 1 | 1 | 1 | 1 | 1 |
| 5 | 1 | 0 | 0 | 0 | 0 | 1 | 1 | 1 | 1 | 1 | 1 | 1 | 1 | 1 | 1 | 1 | 1 |
| 6 | 1 | 0 | 0 | 0 | 0 | 1 | 1 | 1 | 1 | 1 | 1 | 1 | 1 | 1 | 1 | 1 | 1 |
| 7 | 1 | 0 | 0 | 0 | 0 | 1 | 1 | 1 | 1 | 1 | 1 | 1 | 1 | 1 | 1 | 1 | 1 |
| 8 | 1 | 0 | 0 | 0 | 0 | 1 | 1 | 1 | 1 | 1 | 1 | 1 | 1 | 1 | 1 | 1 | 1 |
| 9 | 1 | 0 | 0 | 0 | 0 | 1 | 1 | 1 | 1 | 1 | 1 | 1 | 1 | 1 | 1 | 1 | 1 |
| 10 | 1 | 0 | 0 | 0 | 0 | 1 | 1 | 1 | 1 | 1 | 1 | 1 | 1 | 1 | 1 | 1 | 1 |
| 11 | 1 | 0 | 0 | 0 | 0 | 1 | 0 | 1 | 1 | 1 | 1 | 1 | 1 | 1 | 1 | 1 | 1 |
| 12 | 0 | 1 | 1 | 1 | 1 | 0 | 0 | 0 | 0 | 0 | 0 | 0 | 0 | 0 | 0 | 0 | 0 |
| 13 | 0 | 1 | 1 | 1 | 1 | 0 | 0 | 0 | 0 | 0 | 0 | 0 | 0 | 0 | 0 | 0 | 0 |
| 14 | 0 | 1 | 1 | 1 | 1 | 0 | 0 | 0 | 0 | 0 | 0 | 0 | 0 | 0 | 0 | 0 | 0 |
| 15 | 0 | 1 | 1 | 1 | 1 | 0 | 0 | 0 | 0 | 0 | 0 | 0 | 0 | 0 | 0 | 0 | 0 |
| 16 | 0 | 1 | 1 | 1 | 1 | 0 | 0 | 0 | 0 | 0 | 0 | 0 | 0 | 0 | 0 | 0 | 0 |
| 17 | 0 | 1 | 1 | 1 | 1 | 0 | 0 | 0 | 0 | 0 | 0 | 0 | 0 | 0 | 0 | 0 | 0 |
| 18 | 0 | 1 | 1 | 1 | 1 | 0 | 0 | 0 | 0 | 0 | 0 | 0 | 0 | 0 | 0 | 0 | 0 |
| 19 | 0 | 1 | 1 | 1 | 1 | 0 | 0 | 0 | 0 | 0 | 0 | 0 | 0 | 0 | 0 | 0 | 0 |
| 20 | 0 | 1 | 1 | 1 | 1 | 0 | 0 | 0 | 0 | 0 | 0 | 0 | 0 | 0 | 0 | 0 | 0 |
| 21 | 0 | 1 | 1 | 1 | 1 | 0 | 1 | 0 | 0 | 0 | 0 | 0 | 0 | 0 | 0 | 0 | 0 |
| 20α−18 | 1 | 0 | 0 | 0 | 0 | 1 | 1 | 1 | 1 | 1 | 1 | 1 | 1 | 1 | 1 | 1 | 1 |
| 20α−17 | 1 | 0 | 0 | 0 | 0 | 1 | 1 | 1 | 1 | 1 | 1 | 1 | 1 | 1 | 1 | 1 | 1 |
| 20α−16 | 1 | 0 | 0 | 0 | 0 | 1 | 1 | 1 | 1 | 1 | 1 | 1 | 1 | 1 | 1 | 1 | 1 |
| 20α−15 | 1 | 0 | 0 | 0 | 0 | 1 | 1 | 1 | 1 | 1 | 1 | 1 | 1 | 1 | 1 | 1 | 1 |
| 20α−14 | 1 | 0 | 0 | 0 | 0 | 1 | 1 | 1 | 1 | 1 | 1 | 1 | 1 | 1 | 1 | 1 | 1 |
| 20α−13 | 1 | 0 | 0 | 0 | 0 | 1 | 1 | 1 | 1 | 1 | 1 | 1 | 1 | 1 | 1 | 1 | 1 |
| 20α−12 | 1 | 0 | 0 | 0 | 0 | 1 | 1 | 1 | 1 | 1 | 1 | 1 | 1 | 1 | 1 | 1 | 1 |
| 20α−11 | 1 | 0 | 0 | 0 | 0 | 1 | 1 | 1 | 1 | 1 | 1 | 1 | 1 | 1 | 1 | 1 | 1 |
| 20α−10 | 1 | 0 | 0 | 0 | 0 | 1 | 1 | 1 | 1 | 1 | 1 | 1 | 1 | 1 | 1 | 1 | 1 |
| 20α−9 | 1 | 0 | 0 | 0 | 0 | 1 | 0 | 1 | 1 | 1 | 1 | 1 | 1 | 1 | 1 | 1 | 0 |
| 20α−8 | 0 | 1 | 1 | 1 | 1 | 0 | 0 | 0 | 0 | 0 | 0 | 0 | 0 | 0 | 0 | 0 | 0 |
| 20α−7 | 0 | 1 | 1 | 1 | 1 | 0 | 0 | 0 | 0 | 0 | 0 | 0 | 0 | 0 | 0 | 0 | 0 |
| 20α−6 | 0 | 1 | 1 | 1 | 1 | 0 | 0 | 0 | 0 | 0 | 0 | 0 | 0 | 0 | 0 | 0 | 0 |
| 20α−5 | 0 | 1 | 1 | 1 | 1 | 0 | 0 | 0 | 0 | 0 | 0 | 0 | 0 | 0 | 0 | 0 | 0 |
| 20α−4 | 0 | 1 | 1 | 1 | 1 | 0 | 0 | 0 | 0 | 0 | 0 | 0 | 0 | 0 | 0 | 0 | 0 |
| 20α−3 | 0 | 1 | 1 | 1 | 1 | 0 | 0 | 0 | 0 | 0 | 0 | 0 | 0 | 0 | 0 | 0 | 0 |
| 20α−2 | 0 | 1 | 1 | 1 | 1 | 0 | 0 | 0 | 0 | 0 | 0 | 0 | 0 | 0 | 0 | 0 | 0 |
| 20α−1 | 0 | 1 | 1 | 1 | 1 | 0 | 0 | 0 | 0 | 0 | 0 | 0 | 0 | 0 | 0 | 0 | 0 |
| 20α | 0 | 1 | 1 | 1 | 1 | 0 | 0 | 0 | 0 | 0 | 0 | 0 | 0 | 0 | 0 | 0 | 0 |
| 20α+1 | 0 | 1 | 1 | 1 | 1 | 0 | 1 | 0 | 0 | 0 | 0 | 0 | 0 | 0 | 0 | 0 | 0 |

FIG.3

| Cycle | Tctl | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|
| 1 | 1 | 0 | X | X | 0 | 0 | 0 | 0 | 0 | 0 | 0 | 0 | 0 | A | B | C | D |
| 2 | 1 | 0 | 0 | 0 | 0 | 1 | 1 | 1 | 1 | 1 | 1 | 1 | 1 | 1 | 1 | 1 | 1 |
| 3 | 1 | 0 | 0 | 0 | 0 | 1 | 1 | 1 | 1 | 1 | 1 | 1 | 1 | 1 | 1 | 1 | 1 |
| 4 | 1 | 0 | 0 | 0 | 0 | 1 | 1 | 1 | 1 | 1 | 1 | 1 | 1 | 1 | 1 | 1 | 1 |
| 5 | 1 | 0 | 0 | 0 | 0 | 1 | 1 | 1 | 1 | 1 | 1 | 1 | 1 | 1 | 1 | 1 | 1 |
| 6 | 1 | 0 | 0 | 0 | 0 | 1 | 1 | 1 | 1 | 1 | 1 | 1 | 1 | 1 | 1 | 1 | 1 |
| 7 | 1 | 0 | 0 | 0 | 0 | 1 | 1 | 1 | 1 | 1 | 1 | 1 | 1 | 1 | 1 | 1 | 1 |
| 8 | 1 | 0 | 0 | 0 | 0 | 1 | 1 | 1 | 1 | 1 | 1 | 1 | 1 | 1 | 1 | 1 | 1 |
| 9 | 1 | 0 | 0 | 0 | 0 | 1 | 1 | 1 | 1 | 1 | 1 | 1 | 1 | 1 | 1 | 1 | 1 |
| 10 | 1 | 0 | 0 | 0 | 0 | 1 | 1 | 1 | 1 | 1 | 1 | 1 | 1 | 1 | 1 | 1 | 1 |
| 11 | 1 | 0 | 0 | 0 | 0 | 1 | 1 | 1 | 1 | 1 | 1 | 1 | 1 | 1 | 1 | 1 | 1 |
| 12 | 0 | 1 | 1 | 1 | 1 | 1 | 0 | 0 | 0 | 0 | 0 | 0 | 0 | 0 | 0 | 0 | 0 |
| 13 | 0 | 1 | 1 | 1 | 1 | 0 | 0 | 0 | 0 | 0 | 0 | 0 | 0 | 0 | 0 | 0 | 0 |
| 14 | 0 | 1 | 1 | 1 | 1 | 0 | 0 | 0 | 0 | 0 | 0 | 0 | 0 | 0 | 0 | 0 | 0 |
| 15 | 0 | 1 | 1 | 1 | 1 | 0 | 0 | 0 | 0 | 0 | 0 | 0 | 0 | 0 | 0 | 0 | 0 |
| 16 | 0 | 1 | 1 | 1 | 1 | 0 | 0 | 0 | 0 | 0 | 0 | 0 | 0 | 0 | 0 | 0 | 0 |
| 17 | 0 | 1 | 1 | 1 | 1 | 0 | 0 | 0 | 0 | 0 | 0 | 0 | 0 | 0 | 0 | 0 | 0 |
| 18 | 0 | 1 | 1 | 1 | 1 | 0 | 0 | 0 | 0 | 0 | 0 | 0 | 0 | 0 | 0 | 0 | 0 |
| 19 | 0 | 1 | 1 | 1 | 1 | 0 | 0 | 0 | 0 | 0 | 0 | 0 | 0 | 0 | 0 | 0 | 0 |
| 20 | 0 | 1 | 1 | 1 | 1 | 0 | 0 | 0 | 0 | 0 | 0 | 0 | 0 | 0 | 0 | 0 | 0 |
| 21 | 0 | 1 | 1 | 1 | 1 | 0 | 0 | 0 | 0 | 0 | 0 | 0 | 0 | 0 | 0 | 0 | 0 |
| $20\alpha-18$ | 1 | 0 | 0 | 0 | 0 | 0 | 1 | 1 | 1 | 1 | 1 | 1 | 1 | 1 | 1 | 1 | 1 |
| $20\alpha-17$ | 1 | 0 | 0 | 0 | 0 | 1 | 1 | 1 | 1 | 1 | 1 | 1 | 1 | 1 | 1 | 1 | 1 |
| $20\alpha-16$ | 1 | 0 | 0 | 0 | 0 | 1 | 1 | 1 | 1 | 1 | 1 | 1 | 1 | 1 | 1 | 1 | 1 |
| $20\alpha-15$ | 1 | 0 | 0 | 0 | 0 | 1 | 1 | 1 | 1 | 1 | 1 | 1 | 1 | 1 | 1 | 1 | 1 |
| $20\alpha-14$ | 1 | 0 | 0 | 0 | 0 | 1 | 1 | 1 | 1 | 1 | 1 | 1 | 1 | 1 | 1 | 1 | 1 |
| $20\alpha-13$ | 1 | 0 | 0 | 0 | 0 | 1 | 1 | 1 | 1 | 1 | 1 | 1 | 1 | 1 | 1 | 1 | 1 |
| $20\alpha-12$ | 1 | 0 | 0 | 0 | 0 | 1 | 1 | 1 | 1 | 1 | 1 | 1 | 1 | 1 | 1 | 1 | 1 |
| $20\alpha-11$ | 1 | 0 | 0 | 0 | 0 | 1 | 1 | 1 | 1 | 1 | 1 | 1 | 1 | 1 | 1 | 1 | 1 |
| $20\alpha-10$ | 1 | 0 | 0 | 0 | 0 | 1 | 1 | 1 | 1 | 1 | 1 | 1 | 1 | 1 | 1 | 1 | 1 |
| $20\alpha-9$ | 1 | 0 | 0 | 0 | 0 | 1 | 1 | 1 | 1 | 1 | 1 | 1 | 1 | 1 | 1 | 1 | 1 |
| $20\alpha-8$ | 0 | 1 | 1 | 1 | 1 | 1 | 0 | 0 | 0 | 0 | 0 | 0 | 0 | 0 | 0 | 0 | 0 |
| $20\alpha-7$ | 0 | 1 | 1 | 1 | 1 | 0 | 0 | 0 | 0 | 0 | 0 | 0 | 0 | 0 | 0 | 0 | 0 |
| $20\alpha-6$ | 0 | 1 | 1 | 1 | 1 | 0 | 0 | 0 | 0 | 0 | 0 | 0 | 0 | 0 | 0 | 0 | 0 |
| $20\alpha-5$ | 0 | 1 | 1 | 1 | 1 | 0 | 0 | 0 | 0 | 0 | 0 | 0 | 0 | 0 | 0 | 0 | 0 |
| $20\alpha-4$ | 0 | 1 | 1 | 1 | 1 | 0 | 0 | 0 | 0 | 0 | 0 | 0 | 0 | 0 | 0 | 0 | 0 |
| $20\alpha-3$ | 0 | 1 | 1 | 1 | 1 | 0 | 0 | 0 | 0 | 0 | 0 | 0 | 0 | 0 | 0 | 0 | 0 |
| $20\alpha-2$ | 0 | 1 | 1 | 1 | 1 | 0 | 0 | 0 | 0 | 0 | 0 | 0 | 0 | 0 | 0 | 0 | 0 |
| $20\alpha-1$ | 0 | 1 | 1 | 1 | 1 | 0 | 0 | 0 | 0 | 0 | 0 | 0 | 0 | 0 | 0 | 0 | 0 |
| $20\alpha$ | 0 | 1 | 1 | 1 | 1 | 0 | 0 | 0 | 0 | 0 | 0 | 0 | 0 | 0 | 0 | 0 | 0 |
| $20\alpha+1$ | 0 | 1 | 1 | 1 | 1 | 0 | 0 | 0 | 0 | 0 | 0 | 0 | 0 | 0 | 0 | 0 | 0 |

FIG.4

| Cycle | Tctl | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|
| | | | | | | | | | | | | | | TDAT[1] | | | |
| 1 | 1 | 0 | X | X | 0 | 0 | 0 | 0 | 0 | 0 | 0 | 0 | 0 | A | B | C | D |
| 2 | 1 | 0 | 0 | 0 | 0 | 1 | 1 | 1 | 1 | 1 | 1 | 1 | 1 | 1 | 1 | 1 | 1 |
| 3 | 1 | 0 | 0 | 0 | 0 | 1 | 1 | 1 | 1 | 1 | 1 | 1 | 1 | 1 | 1 | 1 | 1 |
| 4 | 1 | 0 | 0 | 0 | 0 | 1 | 1 | 1 | 1 | 1 | 1 | 1 | 1 | 1 | 1 | 1 | 1 |
| 5 | 1 | 0 | 0 | 0 | 0 | 1 | 1 | 1 | 1 | 1 | 1 | 1 | 1 | 1 | 1 | 1 | 1 |
| 6 | 1 | 0 | 0 | 0 | 0 | 1 | 1 | 1 | 1 | 1 | 1 | 1 | 1 | 1 | 1 | 1 | 1 |
| 7 | 1 | 0 | 0 | 0 | 0 | 1 | 1 | 1 | 1 | 1 | 1 | 1 | 1 | 1 | 1 | 1 | 1 |
| 8 | 1 | 0 | 0 | 0 | 0 | 1 | 1 | 1 | 1 | 1 | 1 | 1 | 1 | 1 | 1 | 1 | 1 |
| 9 | 1 | 0 | 0 | 0 | 0 | 1 | 1 | 1 | 1 | 1 | 1 | 1 | 1 | 1 | 1 | 1 | 1 |
| 10 | 1 | 0 | 0 | 0 | 0 | 1 | 1 | 1 | 1 | 1 | 1 | 1 | 1 | 1 | 1 | 1 | 1 |
| 11 | 1 | 0 | 0 | 0 | 0 | 1 | 0 | 1 | 1 | 1 | 1 | 1 | 1 | 1 | 1 | 1 | 1 |
| 12 | 0 | 1 | 1 | 1 | 1 | 0 | 0 | 0 | 1 | 0 | 0 | 0 | 0 | 0 | 0 | 0 | 0 |
| 13 | 0 | 1 | 1 | 1 | 1 | 0 | 0 | 0 | 0 | 0 | 0 | 0 | 0 | 0 | 0 | 0 | 0 |
| 14 | 0 | 1 | 1 | 1 | 1 | 0 | 0 | 0 | 0 | 0 | 0 | 0 | 0 | 0 | 0 | 0 | 0 |
| 15 | 0 | 1 | 1 | 1 | 1 | 0 | 0 | 0 | 0 | 0 | 0 | 0 | 0 | 0 | 0 | 0 | 0 |
| 16 | 0 | 1 | 1 | 1 | 1 | 0 | 0 | 0 | 0 | 0 | 0 | 0 | 0 | 0 | 0 | 0 | 0 |
| 17 | 0 | 1 | 1 | 1 | 1 | 0 | 0 | 0 | 0 | 0 | 0 | 0 | 0 | 0 | 0 | 0 | 0 |
| 18 | 0 | 1 | 1 | 1 | 1 | 0 | 0 | 0 | 0 | 0 | 0 | 0 | 0 | 0 | 0 | 0 | 0 |
| 19 | 0 | 1 | 1 | 1 | 1 | 0 | 0 | 0 | 0 | 0 | 0 | 0 | 0 | 0 | 0 | 0 | 0 |
| 20 | 0 | 1 | 1 | 1 | 1 | 0 | 0 | 0 | 0 | 0 | 0 | 0 | 0 | 0 | 0 | 0 | 0 |
| 21 | 0 | 1 | 1 | 1 | 1 | 0 | 1 | 0 | 0 | 0 | 0 | 0 | 0 | 0 | 0 | 0 | 0 |
| 20α−18 | 1 | 0 | 0 | 0 | 0 | 1 | 1 | 1 | 0 | 1 | 1 | 1 | 1 | 1 | 1 | 1 | 1 |
| 20α−17 | 1 | 0 | 0 | 0 | 0 | 1 | 1 | 1 | 1 | 1 | 1 | 1 | 1 | 1 | 1 | 1 | 1 |
| 20α−16 | 1 | 0 | 0 | 0 | 0 | 1 | 1 | 1 | 1 | 1 | 1 | 1 | 1 | 1 | 1 | 1 | 1 |
| 20α−15 | 1 | 0 | 0 | 0 | 0 | 1 | 1 | 1 | 1 | 1 | 1 | 1 | 1 | 1 | 1 | 1 | 1 |
| 20α−14 | 1 | 0 | 0 | 0 | 0 | 1 | 1 | 1 | 1 | 1 | 1 | 1 | 1 | 1 | 1 | 1 | 1 |
| 20α−13 | 1 | 0 | 0 | 0 | 0 | 1 | 1 | 1 | 1 | 1 | 1 | 1 | 1 | 1 | 1 | 1 | 1 |
| 20α−12 | 1 | 0 | 0 | 0 | 0 | 1 | 1 | 1 | 1 | 1 | 1 | 1 | 1 | 1 | 1 | 1 | 1 |
| 20α−11 | 1 | 0 | 0 | 0 | 0 | 1 | 1 | 1 | 1 | 1 | 1 | 1 | 1 | 1 | 1 | 1 | 1 |
| 20α−10 | 1 | 0 | 0 | 0 | 0 | 1 | 1 | 1 | 1 | 1 | 1 | 1 | 1 | 1 | 1 | 1 | 1 |
| 20α−9 | 1 | 0 | 0 | 0 | 0 | 1 | 0 | 1 | 1 | 1 | 1 | 1 | 1 | 1 | 1 | 1 | 1 |
| 20α−8 | 0 | 1 | 1 | 1 | 1 | 0 | 0 | 0 | 1 | 0 | 0 | 0 | 0 | 0 | 0 | 0 | 0 |
| 20α−7 | 0 | 1 | 1 | 1 | 1 | 0 | 0 | 0 | 0 | 0 | 0 | 0 | 0 | 0 | 0 | 0 | 0 |
| 20α−6 | 0 | 1 | 1 | 1 | 1 | 0 | 0 | 0 | 0 | 0 | 0 | 0 | 0 | 0 | 0 | 0 | 0 |
| 20α−5 | 0 | 1 | 1 | 1 | 1 | 0 | 0 | 0 | 0 | 0 | 0 | 0 | 0 | 0 | 0 | 0 | 0 |
| 20α−4 | 0 | 1 | 1 | 1 | 1 | 0 | 0 | 0 | 0 | 0 | 0 | 0 | 0 | 0 | 0 | 0 | 0 |
| 20α−3 | 0 | 1 | 1 | 1 | 1 | 0 | 0 | 0 | 0 | 0 | 0 | 0 | 0 | 0 | 0 | 0 | 0 |
| 20α−2 | 0 | 1 | 1 | 1 | 1 | 0 | 0 | 0 | 0 | 0 | 0 | 0 | 0 | 0 | 0 | 0 | 0 |
| 20α−1 | 0 | 1 | 1 | 1 | 1 | 0 | 0 | 0 | 0 | 0 | 0 | 0 | 0 | 0 | 0 | 0 | 0 |
| 20α | 0 | 1 | 1 | 1 | 1 | 0 | 0 | 0 | 0 | 0 | 0 | 0 | 0 | 0 | 0 | 0 | 0 |
| 20α+1 | 0 | 1 | 1 | 1 | 1 | 0 | 1 | 0 | 0 | 0 | 0 | 0 | 0 | 0 | 0 | 0 | 0 |

METHOD AND CIRCUIT FOR DE-SKEWING DATA IN A COMMUNICATION SYSTEM

CROSS-REFERENCE TO RELATED APPLICATIONS

This application is a continuation of U.S. patent application Ser. No. 09/988,896, filed on Nov. 19, 2001, entitled "Method And Circuit For De-Skewing Data In A Communication System", which is hereby expressly incorporated by reference for all purposes.

BACKGROUND OF THE INVENTION

The present invention relates generally to the field of communication systems and more specifically to a method and circuit for de-skewing data in communication systems.

A data-bus typically comprises a number of parallel interface lines for communicating data signals in parallel. However, the data signals in all of the parallel lines are not always received by a receiver at the same time, even though the data signals are simultaneously transmitted in synchronization with the transmitter system clock. This results in a condition known as data skew. Data skew refers to the delay and/or early arrival of a data bit relative to other data bits in the parallel lines. Conventional systems for de-skewing data on computer data-buses are generally well known. While systems for de-skewing data have been applied to other contexts, such systems are inapplicable to certain communication networks such as SONET (synchronous optical network). In part, this is due to certain unique attributes possessed by SONETs. Another reason relates to certain interface standards that SONETs must meet.

SONET is a transport mechanism for multiplexing high-speed data from multiple networks onto fiber optic cabling. It interconnects IP (Internet protocol) networks, ATM (asynchronous transfer mode) switches, T1s and the like via fiber optic networks known as SONET rings. For example, an IP network in San Francisco may be interconnected to a New York IP network via a SONET ring. Since different network types are interconnected, routers are employed for converting protocols from one network type to another. In the case of IP protocols, routers are used for converting the IP packets into a form suitable for transmission on the SONET ring.

A board or line card in the router receives the IP packets on one end, performs the necessary conversions and sends out the packets at the other end. Among other components, a line card includes a framer chip for framing/de-framing IP packets, and a system chip for performing protocol conversion and for controlling packet traffic. The framer chip communicates with the system side through an interface known as the SPI-4 (system packet interface). The SPI-4 interface is a standard defined by a consortium of communication companies for packet and cell transfer between a physical layer device (i.e., the framer chip) and a link layer device (i.e., the system chip). As defined, the SPI-4 interface has a 16 bit data bus at a clock speed of 622 MHz. Other features of the SPI-4 interface include a transmit control signal (TCTL) and a receive control signal (RCTL) between the system chip and the framer chip. Further, the SPI-4 interface requires the system chip to periodically send training sequences to the framer chip for detecting data skew. Alternatively, the training sequences are periodically sent from the framer chip to the system chip.

As noted, data skew refers to the delay and/or early arrival of a data bit relative to other data bits in the parallel lines. The skew may be due to a combination of board layout, environment temperature variation and other reasons. To facilitate understanding the present invention, FIG. 1 is a block diagram of a board level connection 100 for the transmit direction between a system chip 100 and a framer chip 101 illustrating data skew on the 16 bit data-bus.

Figure 1:
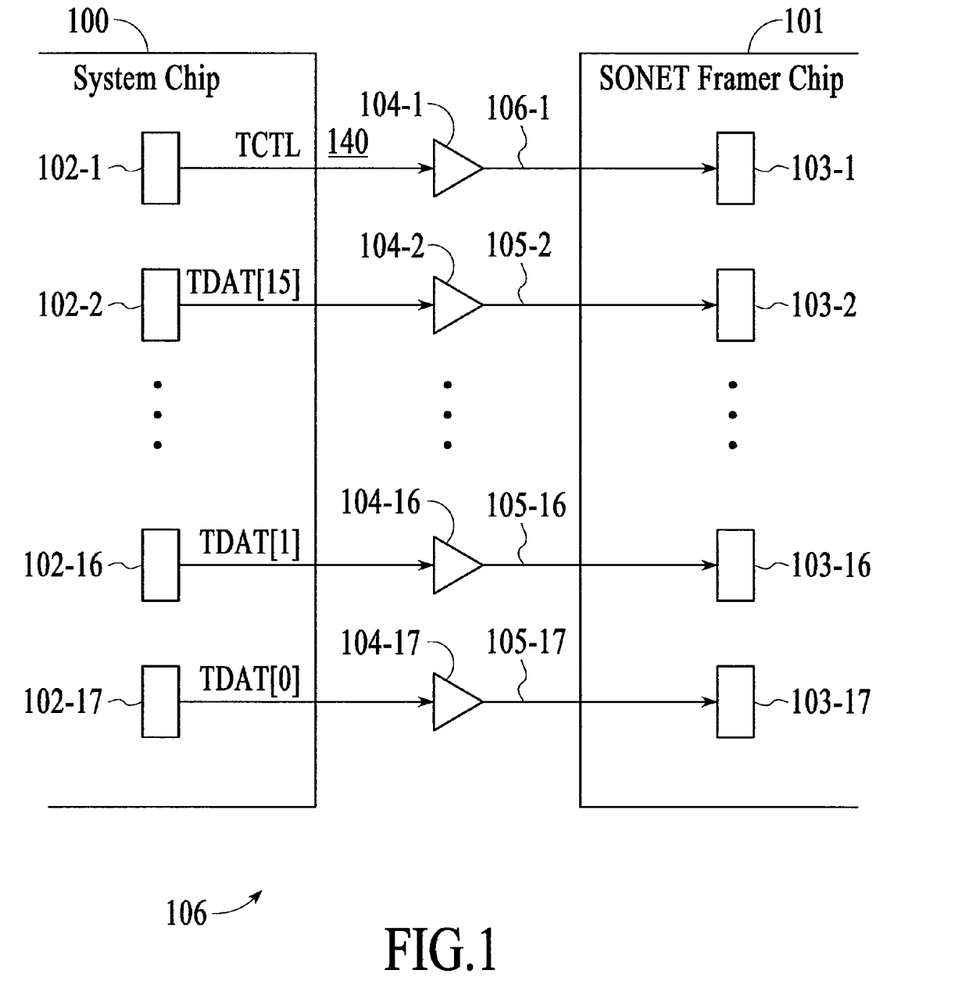
FIG. 1 is a block diagram of a board level connection between a system chip and a framer chip illustrating data skew on an exemplary 16 bit data-bus.

In FIG. 1, the transmit direction has 16 data transmit lines and a transmit control line between system chip 100 and framer chip 101. Each transmit line has a delay buffer 104-1 thorough 104-17, respectively, each representing the total delay caused by board level wires as well as the output delay from system chip 100 and the input delay from framer chip 101. Because the data lines may not be of exactly the same length or same width for all 16 data transmit lines, data bit on each line may each arrive at their destinations 103-1 through 103-17 at different times. Given a clock frequency of 622 MHz (i.e., clock period=1.6 ns) the time differences among the 16 data-bits can be as long as 1 clock cycle or greater thus causing data skew among the data lines. When data skew occurs, all of the data-bits are no longer aligned.

Therefore, there is a need to resolve the aforementioned disadvantage of data communication networks such as SONET and the present invention meets this need.

BRIEF SUMMARY OF TH INVENTION

According to a first aspect of the present invention, a method of de-skewing data in a data communication network such as the synchronous optical network (SONET) is disclosed. The data is sent from a system chip to a framer chip where the data is de-skewed. To detect data skew, the system chip sends a training sequence to the framer chip. In accordance with the present invention, information bits sent to the framer chip are searched in order to detect the training sequence.

The training sequences contain clear transition patterns at which all of the multiple parallel bits of the transmit data and the TCTL signal line are inverted. If any bit does not invert, this bit is detected as a skewed bit. Based on the value of the data one clock cycle before and one clock cycle after this transition, the skewed bit can be corrected. In one embodiment after the data skew is detected, a multiplexing logic circuitry is used to correct the skew based on one clock cycle either before or after the transition.

According to another aspect of the present invention, a method of de-skewing data in a SONET is taught. The SONET has a system chip for communicating a plurality of data-bits to a framer chip through a data-bus. Among other acts, the method includes: forwarding a sequence of training bits from the system chip to the framer chip; and thereafter, receiving the sequence of training bits at the framer chip. Next, the sequence of training bits received is compared to the sequence forwarded in order to determine if one training bit has a maximum skew of +/−1 clock cycle. If the training bit is not skewed, a no-skew input is selected for receiving the plurality of data-bits.

On the other hand, if the training bit is skewed, it is determined whether there is a late skew or an early skew. If a late skew exists, the late skew is corrected by selecting a late skew input for receiving the plurality of data-bits. It should be noted that the data-bits at the second input are at least one clock cycle earlier than the data-bits for the no skew input. If there is an early skew, however, the early skew is corrected by selecting an early skew input for receiving the plurality of data-bits. The data-bits at the early skew are at least one clock cycle later than the data-bits at the no skew input.

According to another aspect of the present invention, after determining that a data skew exists, any one of three inputs is selected to receive the plurality of data-bits, wherein a first input is selected if there is no data skew, a second input is selected if there is a late skew, or a third input is selected if an early skew occurs.

BRIEF DESCRIPTION OF THE DRAWINGS

FIG. 2 is a table illustrating an exemplary training sequence for de-skewing bit arrival times on data and control line in accordance with a first embodiment of the present invention.

FIG. 3 is a received training sequence illustrating early data skew, the training sequence being received by the framer chip.

FIG. 4 is a training sequence for illustrating late data skew, the training sequence being received by a framer chip.

FIG. 5 is a training sequence for illustrating both early and late data skew, the training sequence being received by a framer chip.

A further understanding of the nature and advantages of the present invention herein may be gained by reference to the remaining portions of the specification and the attached drawings. Further features and advantages of the present invention, as well as the structure and operation of various embodiments of the present invention, are described in detail below with respect to the accompanying drawings. In the drawings, the same reference numbers indicate identical or functionally similar elements.

DETAILED DESCRIPTION OF THE INVENTION

In a communication system such as a synchronous optical network (SONET), a framer chip communicates with a system chip through a system packet interface (SPI) standard such as SPI-4 (10 Gb/s) or SPI-5 (40 Gb/s). The SPI-4, for example, has a 16 bit data-bus in the transmit direction (TDAT [15:0]) where [15:0] indicates bits 0 through 15, and has an associated transmit control signal (TCTL). Further, the bit data bus has a 16 bit data-bus in the receive direction (RDAT [15:0]) with a corresponding receive control signal (RCTL). According to a first aspect of the present invention, a method of de-skewing TDAT[15:0] in the SONET is disclosed.

Prior to de-skewing, it is determined if a data skew exists by sending a training sequence from the system chip to the framer chip. If there is no skew, a no-skew input of a multiplexor circuit is selected for receiving the plurality of data-bits. If a skew does exist, it is determined whether there is a late skew or an early skew. If there is a late skew, it is corrected by selecting a late skew input for receiving the plurality of data-bits. Otherwise, the early skew is corrected by selecting an early skew input of the multiplexor.

FIG. 2 is a table illustrating an exemplary training sequence 200 for de-skewing bit arrival times on data lines 105-2 through 105-17 (FIG. 1) and control line 106 in accordance with a first embodiment of the present invention. In the present embodiment, training sequence 200 is compliant with the OIF-SPI4-01.0 and 02.0, phases 1 and 2 defining an interface between physical and link layer, or peer to peer entities operating at an OC-192 rate, and an interface for physical and link layer devices, respectively.

Figure 1A:
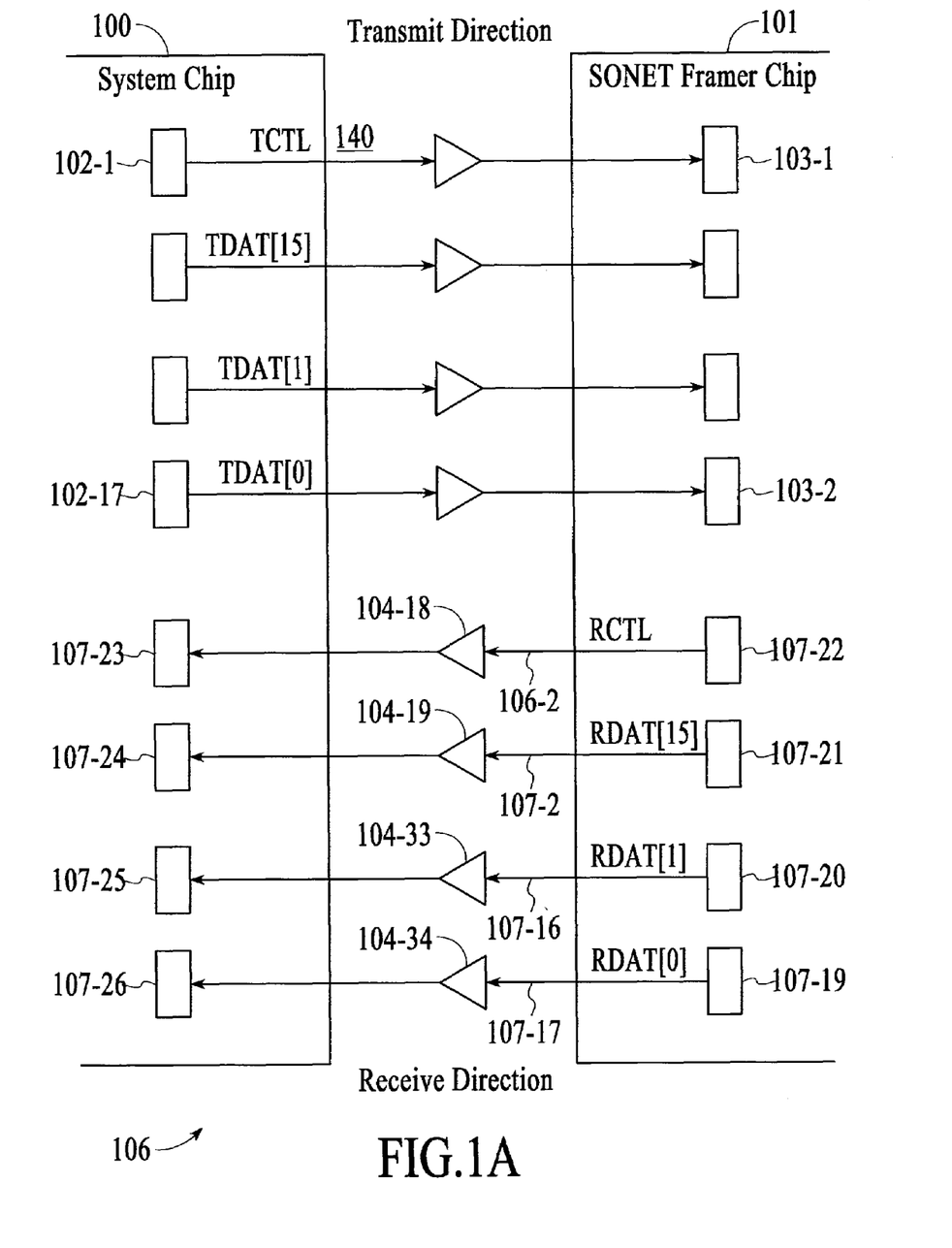
FIG. 1A is an exemplary block diagram of a board level connection between a system chip and a framer chip illustrating both the receive and transmit directions.

To de-skew data arriving at an interface, training sequence 200 is sent either by system chip 100 (FIG. 1) or framer chip 100 depending on which interface de-skewing is required. For example, if data de-skew is required on framer chip 101 interface, training sequence 200 is sent by system chip 100 to the framer chip interface. When framer chip 101 receives the training sequence, it compares the received sequence with the training sequence forwarded by system chip 101. If the sequences match up, there is no data skew. Otherwise, data skew is present. Data de-skew will also be needed by system chip 100 in the receive direction. When this is required, training sequence 200 is sent by framer chip 101 in the receive direction as shown in FIG. 1A. In FIG. 1A, both the receive and transmit directions are shown. The training sequence for the receive direction is sent as RDAT[0] through RDAT[15], that is via lines 107-17 through 107-2.

As shown, training sequence 200 comprises one or more repetitions of a known training pattern of 1s and 0s. The training pattern includes training data words TDAT [i] (transmit data) where i is the number of data lines. Training sequence 200 also includes a number of TCTL (transmit control) words and a cycle wherein each word is sent. In this exemplary embodiment, the length of training is at least 21 cycles as shown at 202 wherein the number of cycles depend on α, a system dependent variable. As noted, if the data received at the destination is the same as those in FIG. 2, there is no skew among the data lines. When there are skews among the 16 bit data lines, there can be three situations illustrated in FIGS. 3, 4 and 5.

FIG. 3 is a received training sequence 300 illustrating early data skew, the training sequence being received by framer chip 101. In FIG. 3, during cycle 11, bit 10 of transmit data (TDAT[10]) is one clock cycle ahead of the other bits. That is, TDAT[10] is 0 where it should be 1. Because TDAT[10] should be 0 during cycle 12 and not cycle 11, it is one cycle early.

FIG. 4 is a received training sequence 400 illustrating late data skew, the training sequence being received by framer chip 101. In FIG. 4, in cycle 12, TDAT[11] is 1 clock cycle behind the other bits in the table.

FIG. 5 is a received training sequence 500 illustrating both early and late data skew, the training sequence being received by framer chip 101. In FIG. 5, TDAT[10] is 1 clock cycle ahead, while TDAT[8] is 1 clock cycle behind the other bits.

The above figures illustrate the basic idea of de-skew. First, a known data sequence is sent through the interface. Next, the data at the destination is compared bit by bit with the original data. For each bit, if the value at the destination matches the value at the source, there is no skew for this bit. If the value at the destination mismatches the value at the source, a data skew has taken place. It should be observed that, in this example, the data at each bit remains the same value for 10 clock cycles and then it is inverted, and remains at the inverted value for another 10 clock cycles, when it is inverted back. Thus every 20 clock cycles makes up a complete training period. It is to be understood that the specific numbers of clock cycles are exemplary.

The total number of periods in the training process is determined by the value α. The tasks for the de-skew include the following: (1) searching for the training sequences; (2) identifying the transition instances; (3) comparing the received values at the destinations with the source values, if there is a match, there is no skew, otherwise, a skew exists; (4) based on the values of the received data, and TCTL 140, determine if the skew is an early skew or a late skew; and (5) based on the results of (4), correct the skews.

The above five tasks make up the three major portions of the circuit to de-skew the transmit data, namely the search for the training sequences (tasks 1 and 2), the determination of early or late skews for every bit in the data bus (tasks 3 and 4), and the data path to correct any possible skews.

Figure 6:
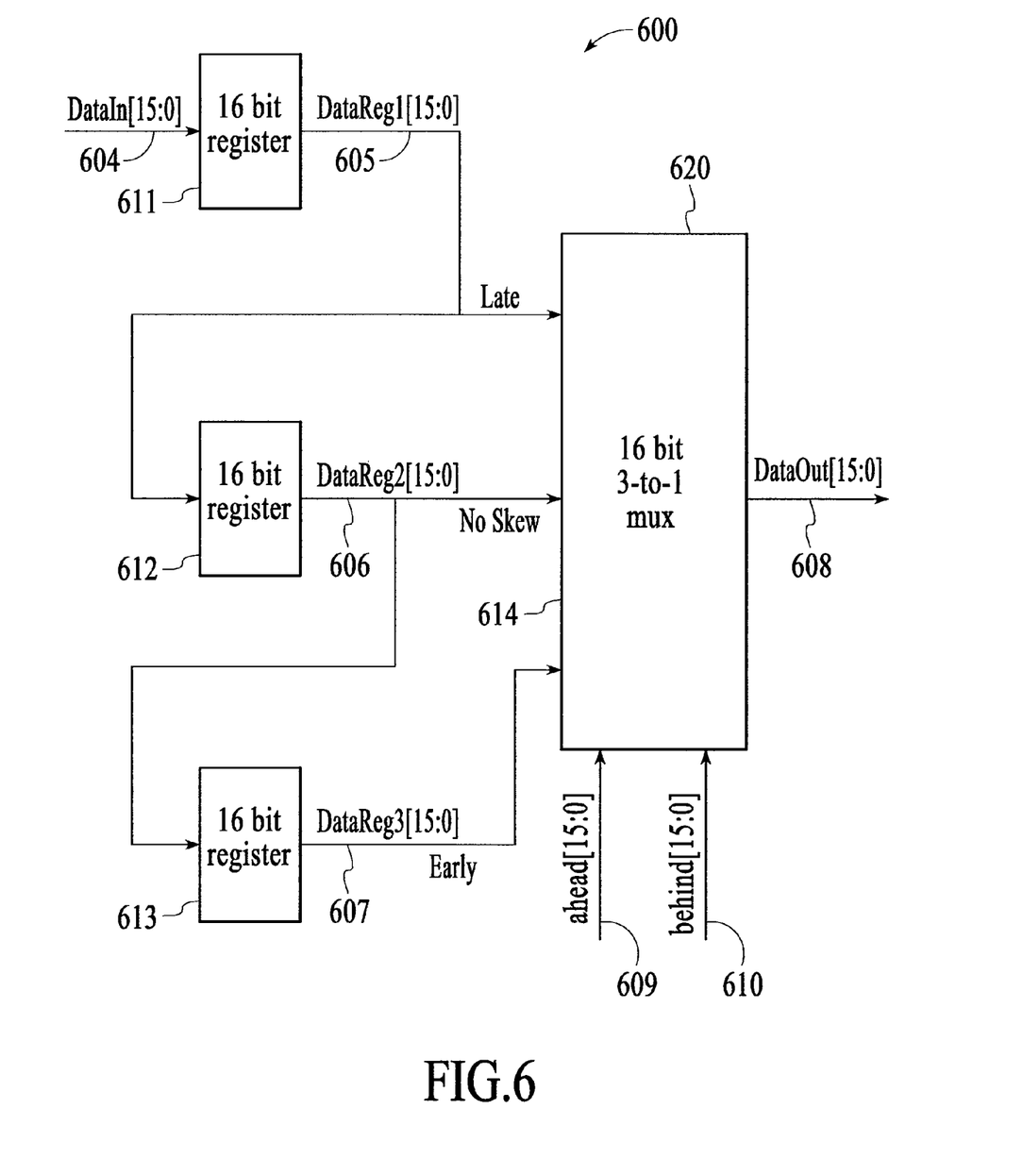
FIG. 6 is a block diagram of a multiplexor circuitry for correcting data skew on a 16 bit data-bus in accordance with an exemplary embodiment of the present invention.

FIG. 6 is a block diagram of circuitry 600 according to an exemplary embodiment of the present invention for correcting data skew on a 16 bit data bus such as DataIn[15:0] 604.

Among other components, circuitry 600 comprises a multiplexor 620 and three 16-bit data registers namely a first register 611, a second register 612, and a third register 613. Multiplexor 620 is a 3:1 mux having three inputs and one output. The first input is coupled to an output port DataReg1[15:0] 605 of first register 611. The second input is coupled to an output port DataReg2[15:0] 606 of the second register 612 while the third output is coupled to an output port DataReg3[15:0] 607 of the third register 613. Further, DataReg1[15:0] 605 is connected to the only input of the second register 612 while DataReg1[15:0] 606 is coupled to the input of the third 613.

A 16 bit data bus DataIn[15:0] 604, is registered three times at DataReg1[15:0] 605, DataReg2[15:0] 606, and DataReg3[15:0] 607. The data from the above three registers go through mux 620 with two selection lines, ahead[15:0] 609 and behind[15:0] 610, and the output of the mux 620 is the de-skewed data DataOut[15:0] 608. For each bit on the data bus, if there is no skew, the data on DataReg2[15:0] is selected. If the bit is ahead by 1 bit, the data on DataReg3[15:0] is selected. If the bit is behind by 1 bit, the data on DataReg1[15:0] is selected. The selection lines, ahead[15:0] 609, and behind[15:0] 610, are determined in the control logic portion of the circuit. One of ordinary skill in the art will realize that circuitry 600 is illustrative and may be replaced by other circuits consistent with the spirit and scope of the present invention.

Figure 7:
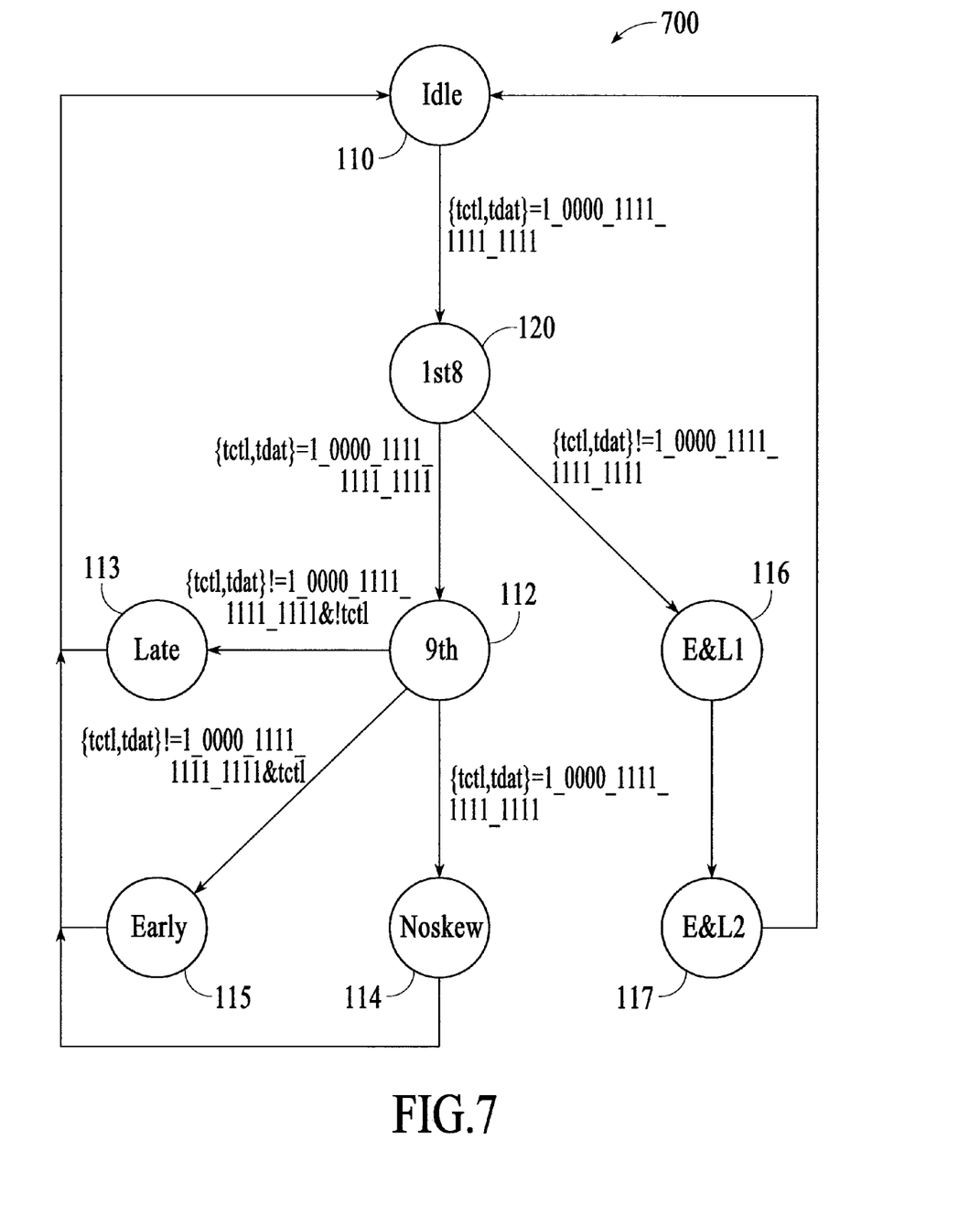
FIG. 7 shows a state diagram (machine) for detecting a training sequence in accordance with an exemplary embodiment of the present invention.

FIG. 7 shows a state diagram (machine) 700 for searching the training sequences in accordance with an exemplary embodiment of the present invention.

State machine 700 initializes in an idle 110 state where there is no training sequence. When the first pattern of the Transmit Control and the Transmit Data {tctl, tdat}=1_ 0000_1111_1111_1111 is detected (as shown in cycle 2 in FIG. 2), state diagram 700 enters a 1st8 state 120 where a pattern of eight consecutive patterns of {tctl, tdat}=1_0000_ 1111_1111_1111 in eight clock cycles are anticipated. If during this period of time, any received pattern is not 1_0000_1111_1111_1111_1111, state machine 700 goes back to idle 110 state. When eight consecutive training sequences are received, there are two possibilities for the next pattern: (1) the 9th pattern is either the training pattern again, or (2) it is not the training pattern any more.

For the first situation, the state machine goes to a 9th 112 state and for the second situation, state machine 700 goes to an E&L1 116 state. 9th 112 state corresponds to either a no skew situation or one of the situations in FIG. 2 or 3, where there are either all early skews or all late skews. The E&L1 116 state corresponds to the situation in FIG. 4, where the skews are both early and late.

From 9th 112 state, if the next pattern is the training pattern again, that means all 10 patterns received are training patterns, and there is no skew detected. Thus the state machine enters the noskew 114 state and from there it goes back to idle 110 state. Another possibility from 9th 112 state is that the 10th pattern is not the training pattern. In this situation, if TCTL 140 is low, the corresponding bit is late by 1 clock cycle, and the state machine goes to late 113 state where it goes back to idle 110 state in the next clock cycle. If TCTL 140 is high, the corresponding bit is early by 1 clock cycle, and the state machine enters an early 115 state from where it goes back to idle 110 state. The situation in FIG. 5, where both early and late skews take place, are covered in E&L1 state 116 and E&L2 state 117. The state machine goes back to idle 110 state from E&L2 117 state.

Figure 8:
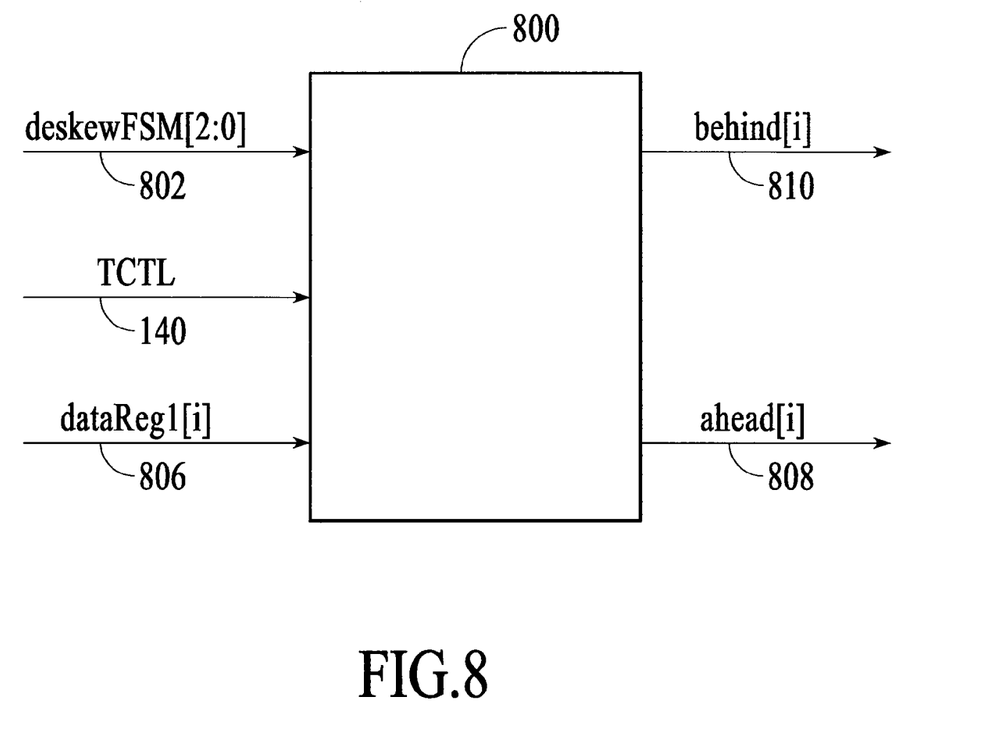
FIG. 8 is a block diagram of an exemplary control circuit for the selection lines of the multiplexor of FIG. 6.

FIG. 8 is a block diagram of a control circuitry 800 for the selection lines of multiplexor 620 of FIG. 6.

Although not shown, control circuitry 800 comprises logic circuitry implemented by known logic techniques based on desired inputs and outputs of the present invention. In FIG. 8, control circuitry 800 receives three inputs namely de-skewFSM[2:0] 802, TCTL 140 and dataReg1[i] 806 where (i=0, 1, . . . , 15). The outputs of control circuitry 800 are selection lines, ahead[i] 808 and behind[i] 810, where ahead[i] corresponds to 609 and behind[i] is 610 in FIG. 6.

Referring to FIG. 7, the logic for control circuitry 800 is obtained using state machine 700. The values of ahead[i] and behind[i] can be changed only when de-skewFSM[2:0] 802 is in one of the following states: noskew 114 state, late 113 state, early 115 state, E&L1 state 116 state or E&L2 state 117.

The combination of the circuitry 600, state machine 700 and circuitry 800 of FIGS. 6, 7, and 8 respectively make up the de-skew circuit. As evident in FIG. 6, the longest delay in this de-skew data path is from DataIn 604 through the third data register 607 and it takes three clocks for DataIn to get to the third data register. For timing concerns, it is the best to register the output of DataOut, 606. Thus a total of 4 clock cycles delay may occur to the data going through the de-skew logic.

In this fashion, the present invention provides a circuit and method for de-skewing data in a communication system. While the above is a complete description of exemplary specific embodiments of the invention, additional embodiments are also possible. For example, the above discussion can easily be extended to a skew worse than +/−1 bit time.

Figure 9:
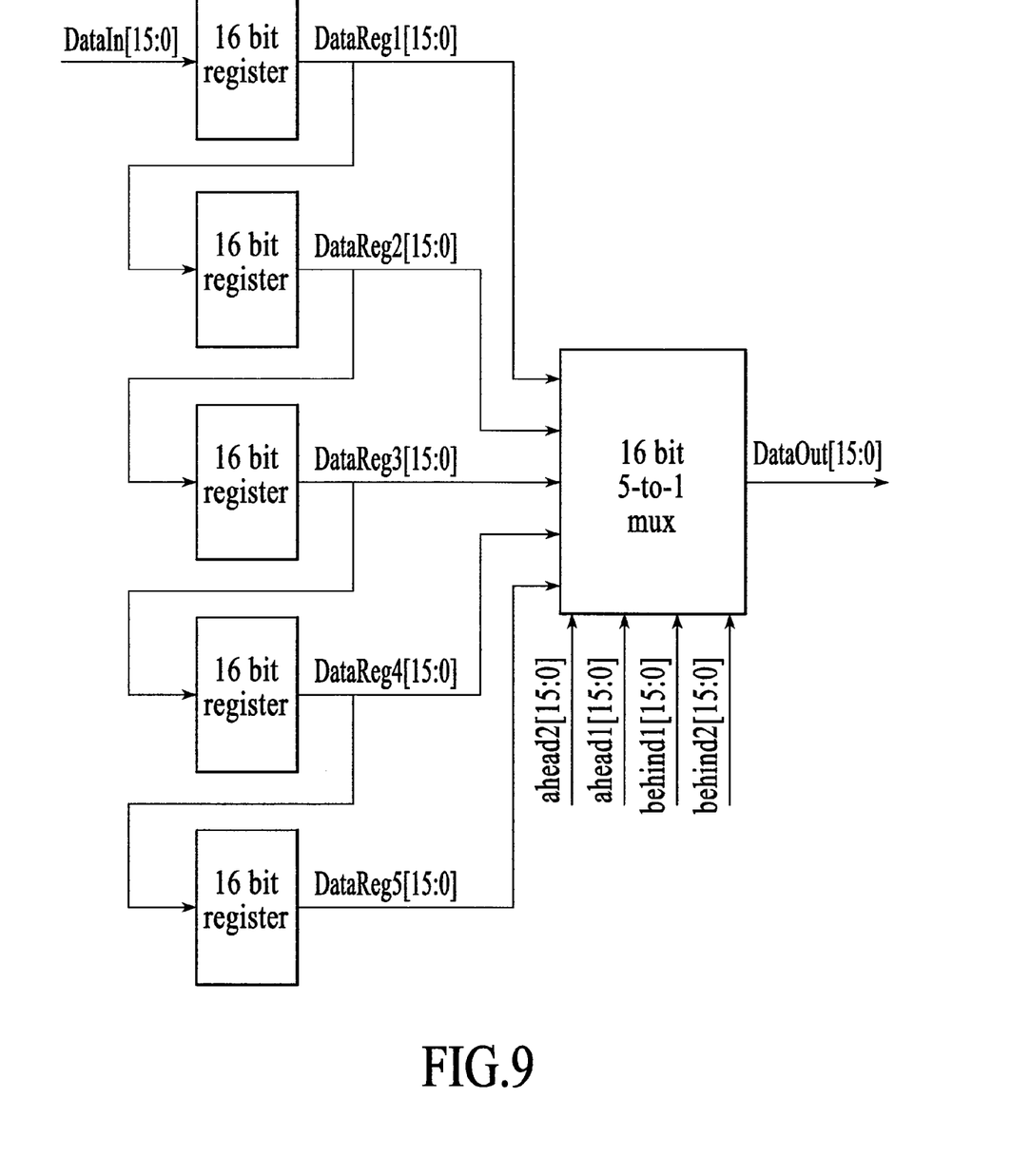
FIG. 9 is a block diagram of an alternate multiplexor circuitry for correcting data skew.
Figure 10:
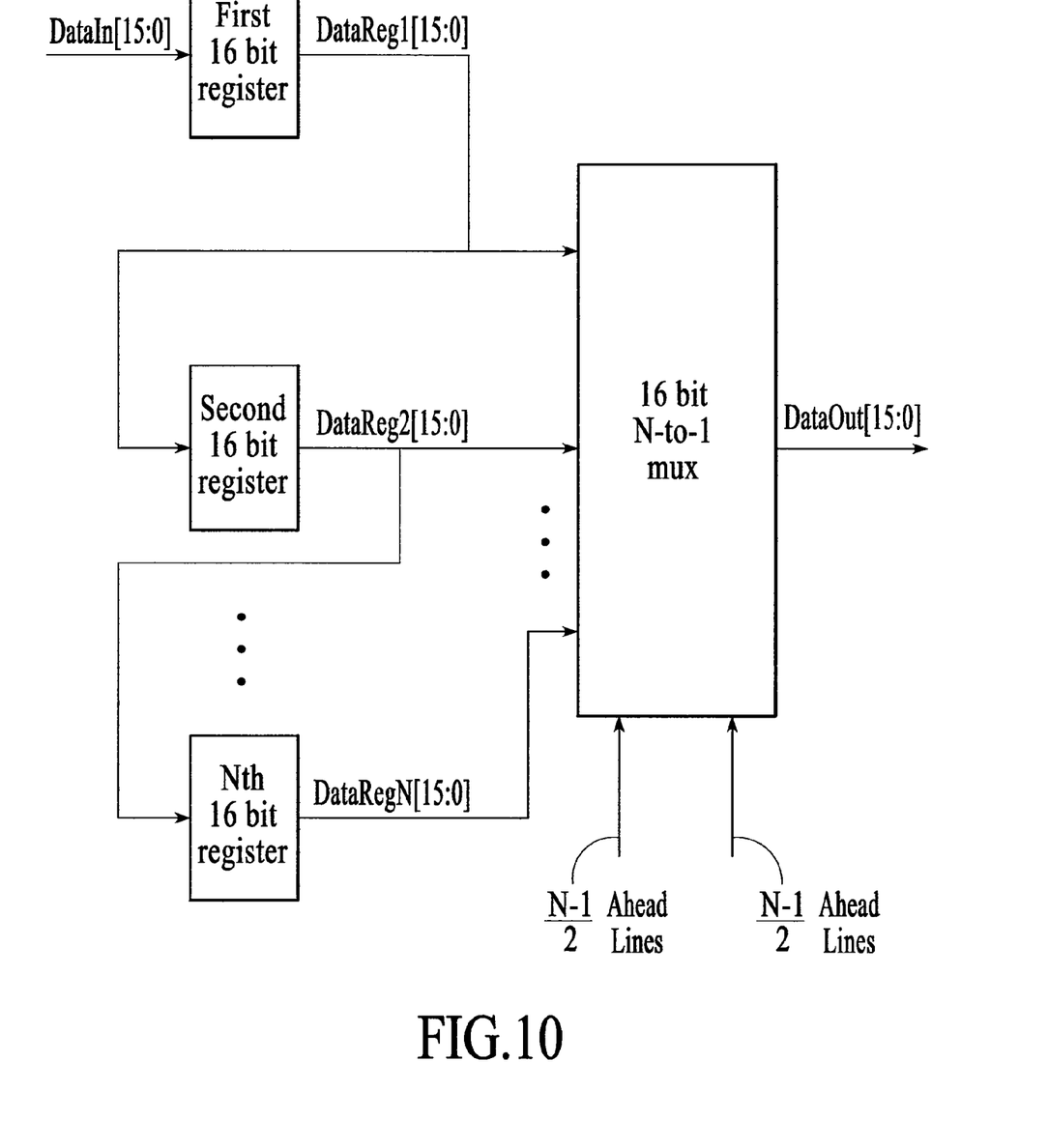
FIG. 10 is a generic circuit for correcting bit arrival time in accordance with the present invention.

For the case of a maximum skew of +/−2 bit time, the data path portion of the de-skew circuitry 900 is shown. In FIG. 9, five levels, instead of three levels as in FIG. 6, of registers are needed to store the possible early or late data. A generic circuit for correcting bit arrival time is shown in FIG. 10. Depending on the maximum skew time, N levels are employed for correcting the skew where N is the levels of registers. As shown, the number of ahead selection lines is (N−1)/2 while the number for the behind selection lines is also (N−1)/2. Modifications for the corresponding state machine and selection lines logic can easily be obtained by one of ordinary skill in the art. It should be observed that while the description of the present invention has been with regard to sending a training sequence in the transmit direction, the training sequence can be sent in the receive direction as well. Furthermore, methods and circuitry presented herein are not limited to a specific SONET system, and may be applied to other types of data communication networks using varying interface standards.

Therefore, the above description should not be taken as limiting the scope of the invention, which is defined by the appended claims along with their full scope of equivalents.

What is claimed is:

1. A method of de-skewing data, the method comprising:
analyzing a training sequence of bits transmitted over a communication channel to detect a skew in the training sequence;
when an early skew is detected from the training sequence, selecting data from an early-skew data input configured to correct for an early skew in data transmitted over the communication channel; and
when a late skew is detected from the training sequence, selecting data from an late-skew data input configured to correct for a late skew in the data transmitted over the communication channel.

2. The method of claim 1, further comprising determining whether a detected skew is the late skew or the early skew.

3. The method of claim 1, wherein analyzing the training sequence comprises comparing data from the training sequence to data from a known training sequence pattern.

4. The method of claim 1, wherein the training sequence is analyzed by a framer circuit configured to detect whether a detected skew is the late skew or the early skew.

5. The method of claim 1, wherein the data received from the early-skew data input is at least one clock cycle earlier with respect to data received from a no-skew data input.

6. The method of claim 1, wherein the data received from the late-skew data input is at least one clock cycle later with respect to the data to data received from a no-skew data input.

7. The method of claim 1, further comprising selecting no-skew data input from a no-skew register.

8. The method of claim 1, wherein selecting the early-skew data input comprises selecting the data from an early-skew register.

9. The method of claim 1, wherein selecting the late-skew data input comprises selecting the data from a late-skew register.

10. A system for de-skewing data, the system comprising:
means for analyzing a training sequence of bits transmitted over a communication channel to detect a skew in the training sequence;
means for selecting data from an early-skew data input configured to correct for an early skew in data transmitted over the communication channel when an early skew is detected from the training sequence; and
means for selecting data from an late-skew data input configured to correct for a late skew in the data transmitted over the communication channel when a late skew is detected from the training sequence.

11. The system of claim 10, wherein the means for analyzing the training sequence of bits comprises means for comparing the training sequence to a known training sequence data pattern.

12. The system of claim 10, wherein the data received from the early-skew data input is at least one clock cycle earlier with respect to the data associated with a no-skew data input.

13. The system of claim 10, wherein the data received from the late-skew data input is at least one clock cycle later with respect to the data associated with a no-skew data input.

14. The system of claim 10, further comprising means for switching the data transmitted over the communication channel between the early-skew data input and the late-skew data input.

15. The system of claim 10, further comprising means for separating the early-skew data input and a no-skew data input by at least a one-clock cycle timing separation.

16. The system of claim 10, further comprising means for separating a no-skew data input and the late-skew data input by at least a one-clock cycle timing separation.

17. A framer circuit for data de-skewing data, the framer circuit comprising:
a first circuit configured to detect a skew in a training sequence of bits;
a second circuit configured to detect that the skew is an early skew or a late skew; and
a third circuit configured to select data from a no-skew data input when no skew is detected, selecting data from an early-skew data input when an early skew is detected, and selecting data from a late-skew data input when a late skew is detected.

18. The framer circuit of claim 17, wherein the first circuit comprises a comparison circuit that compares the training sequence of bits to a known sequence of bits.

19. The framer circuit of claim 17, wherein the second circuit comprises a comparison circuit that compares whether each bit of the training sequence of bits are ahead by one bit or behind by one bit.

20. The framer circuit of claim 17, wherein the second circuit comprises a state machine configured to process the training sequence of bits.

21. The framer circuit of claim 17, wherein the framer circuit comprises a first register which supplies data to the no-skew data input,
a second register which supplies data to the early-skew data input, and
a third register which supplies data to the late-skew data input.

* * * * *

UNITED STATES PATENT AND TRADEMARK OFFICE
CERTIFICATE OF CORRECTION

PATENT NO.       : 7,643,517 B2                                    Page 1 of 1
APPLICATION NO.  : 11/514358
DATED            : January 5, 2010
INVENTOR(S)      : Annadurai et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 648 days.

Signed and Sealed this

Sixteenth Day of November, 2010

David J. Kappos
*Director of the United States Patent and Trademark Office*